(12) United States Patent
Hebert et al.

(10) Patent No.: US 12,003,539 B2
(45) Date of Patent: Jun. 4, 2024

(54) APPLICATION SELF-DEFENSE THROUGH DECEPTIVE MESSAGE TRANSMISSION

(71) Applicant: SAP SE, Walldorf (DE)

(72) Inventors: Cedric R. J. Hebert, Mougins (FR); Merve Sahin, Antibes (FR)

(73) Assignee: SAP SE, San Francisco, CA (US)

( * ) Notice: Subject to any disclaimer, the term of this patent is extended or adjusted under 35 U.S.C. 154(b) by 317 days.

(21) Appl. No.: 17/405,267

(22) Filed: Aug. 18, 2021

(65) Prior Publication Data
US 2023/0068346 A1    Mar. 2, 2023

(51) Int. Cl.
*H04L 9/40* (2022.01)
*G06F 9/54* (2006.01)

(52) U.S. Cl.
CPC .......... *H04L 63/1491* (2013.01); *G06F 9/547* (2013.01)

(58) Field of Classification Search
CPC .. H04L 63/1491; H04L 63/1425; G06F 9/547
See application file for complete search history.

(56) References Cited

U.S. PATENT DOCUMENTS

| | | | | |
|---|---|---|---|---|
| 10,110,629 B1 * | 10/2018 | Kruse | ................. | H04L 63/1491 |
| 2011/0276597 A1 * | 11/2011 | Little | ................. | H04L 63/1416 |
| | | | | 709/227 |
| 2015/0350213 A1 * | 12/2015 | Varadarajan | ............ | H04L 63/06 |
| | | | | 713/189 |
| 2016/0162688 A1 | 6/2016 | Call et al. | | |
| 2016/0359901 A1 * | 12/2016 | Yang | ....................... | G06F 21/54 |
| 2019/0081980 A1 * | 3/2019 | Luo | ........................ | G06N 20/00 |
| 2019/0222587 A1 * | 7/2019 | Kamir | ................. | H04L 63/1491 |
| 2019/0238593 A1 * | 8/2019 | Larmuseau | ............... | G06F 8/65 |
| 2019/0268358 A1 * | 8/2019 | McClintock | .......... | H04L 63/145 |
| 2020/0204590 A1 * | 6/2020 | Whitham | .............. | G06F 21/552 |
| 2021/0152598 A1 * | 5/2021 | Kapelevich | ......... | H04L 63/0281 |
| 2021/0281605 A1 * | 9/2021 | Thangellapalli | ...... | H04L 67/143 |
| 2022/0045990 A1 * | 2/2022 | Subbarayan | ........ | H04L 63/1458 |
| 2023/0052452 A1 * | 2/2023 | Choochotkaew | ....... | G06F 21/53 |

OTHER PUBLICATIONS

Sun, Jianhua; Sun, Kun; Li, Qi; "Towards a Believable Decoy System: Replaying Network Activities from Real System," 2020 IEEE Conference on Communications and Network Security (CNS), Avignon, France, 2020, pp. 1-9.*

(Continued)

*Primary Examiner* — Victor Lesniewski
(74) *Attorney, Agent, or Firm* — SCHWEGMAN LUNDBERG & WOESSNER, P.A.

(57) ABSTRACT

In an example embodiment, rather than merely identifying and patching vulnerabilities, a defender in a computer system is able to utilize deception to set traps for attackers who might attack an application. In this manner, rather than the attacker simply merely needing one entry point to succeed, the attacker would then need to avoid all traps, and the defender only needs one trap to be alerted of the attacker. More particularly, in an example embodiment, traps are set in a way that fools attackers, by blending deceptive but believable network traffic into real traffic to and from the application.

20 Claims, 9 Drawing Sheets

(56) References Cited

OTHER PUBLICATIONS

Efendi; Ibrahim; Zawawi; Rahim; Pahri; Ismail; "A Survey on Deception Techniques for Securing Web Application," 2019 IEEE 5th Intl Conf on Big Data Security on Cloud, IEEE Intl Conf on High Performance and Smart Computing, and IEEE Intl Conf on Intelligent Data and Security, Washington, DC, USA, 2019, pp. 328-331.*

"European Application Serial No. 21211220.5, Extended European Search Report dated May 23, 2022", 10 pgs.

"The RASP market size is expected to grow from USD 294.7 million in 2017 to USD 1,240.1 million by 2022, at a Compound Annual Growth Rate (CAGR) of 33.3%", Reportlinker, [Online]. Retrieved from the Internet: URL: https:www.prnewswire.com news-releases the-rasp-market-size-is-expected-to-grow-from-usd-2947-million-in-2017-to-usd-12401-million-by-2022-at-a-compound-annual-growth-rate-cagr-of-333-300578893.html, (Jan. 8, 2018), 3 pgs.

Araujo, Frederico, "Engineering Cyber-Deceptive Software (dissertation)", University of Texas at Dallas, (2016), 199 pgs.

Sanders, Chris, "Idh Invoke-HoneyCreds-IDS", GitHub, [Online]. Retrieved from the Internet: URL: https: github.com chrissanders idh blob master Invoke-HoneyCreds-IDH.ps1, (Accessed May 25, 2022), 2 pgs.

\* cited by examiner

APPLICATION SELF-DEFENSE THROUGH DECEPTIVE MESSAGE TRANSMISSION

BACKGROUND

In the past decades, the World Wide Web has been embraced by millions of organizations as an inexpensive means to communicate and exchange information with prospects and customers. In particular, it provides a way to identify and communicate with potential customers, and also a mechanism to engage with customers.

Data used for this engagement is captured, stored, processed, and transmitted, either immediately or at a later date. Applications utilize mechanisms such as submit fields, inquiry and login forms, shopping carts. and content management systems to perform these actions.

These systems, however, are vulnerable to attacks from malicious entities, such as criminals attempting to defraud an organization using the application or to simply gain access to private customer data.

Traditional information security involves a defender, such as an organization or an agent of the organization, identifying vulnerabilities in the application and patching them. An attacker, however, needs only one entry point to succeed.

BRIEF DESCRIPTION OF DRAWINGS

The present disclosure is illustrated by way of example and not limitation in the figures of the accompanying drawings, in which like references indicate similar elements.

FIG. 1 is a block diagram illustrating an architecture for application self-defense through deceptive message transmission, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, rather than merely identifying and patching vulnerabilities, a defender is able to utilize deception to set traps for attackers. In this manner, rather than the attacker merely needing one entry point to succeed, the attacker would then need to avoid all traps, and the defender only needs one trap to be alerted of the attacker. More particularly, in an example embodiment, traps are set in a way that deceives attackers, by blending deceptive but believable network traffic into real traffic to and from the application.

In an example embodiment, extra server calls are added to normal network traffic. This is performed in a manner that accomplishes several goals. First, it makes it look like the attack surface is larger than it really is, forcing the attacker to spend more time exploring. Second, it becomes easier to detect that an attack is ongoing, since the deceptive operations are not supposed to be influenced by the end user. Third, it sends additional deceptive information to the attacker, which can then be used as further traps to disrupt an ongoing attack.

Figure 1:
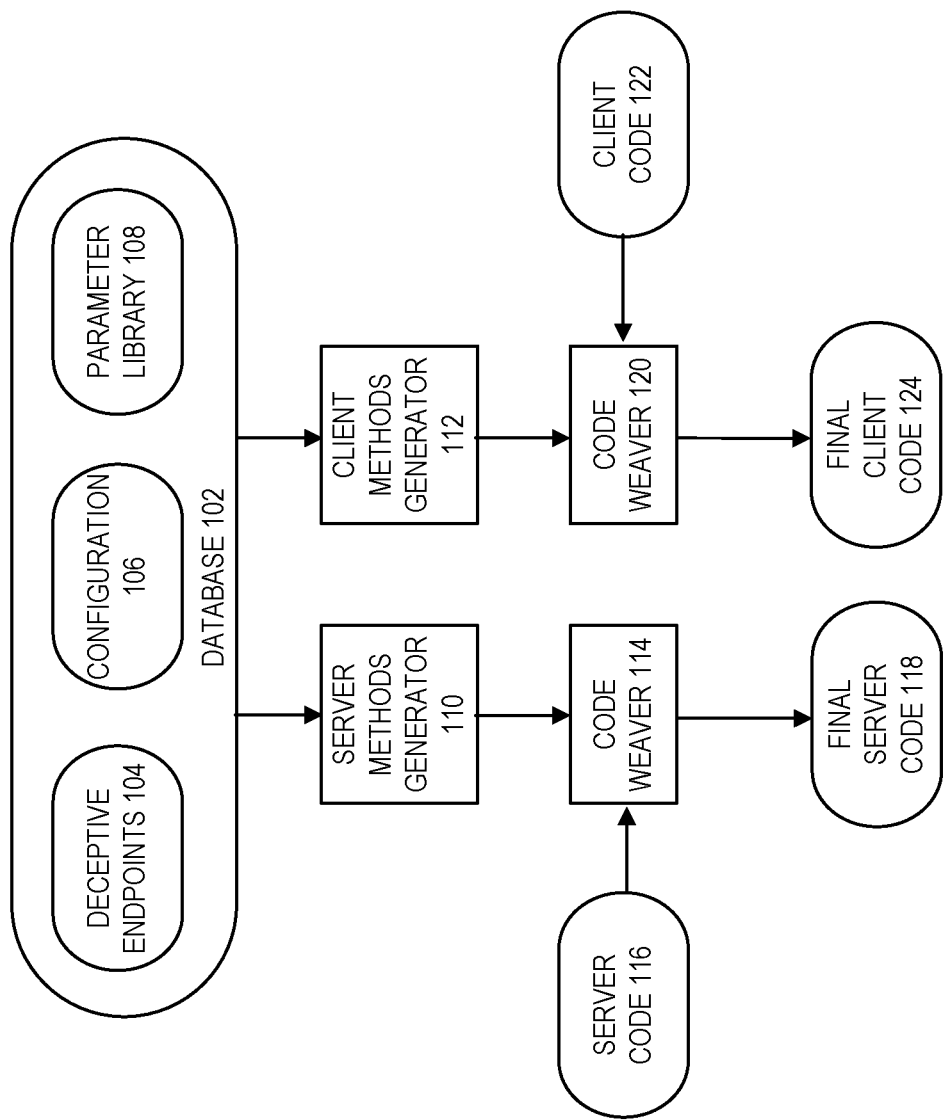
FIG. 1 is a block diagram illustrating an example system for using a sliding

FIG. 1 is a block diagram illustrating an architecture 100 for application self-defense through deceptive message transmission, in accordance with an example embodiment. Architecture 100 includes database 102 containing a list of deceptive endpoints 104, a configuration 106, and a parameter library 108. The list of deceptive endpoints 104 includes an identification of one or more "fake" endpoints, such as application program interfaces (APIs). In an example embodiment, these may be defined in the OpenAPI format. These deceptive endpoints may be generated either manually or through an automatic process that will be described in more detail below. Regardless of how they are generated, they are believable endpoints that may be used to fool an attacker.

The configuration 106 describes how to bind deceptive endpoint parameters with methods of the parameter library 108.

The parameter library 108 is a set of methods that are used for implementing the behavior of a number of parameters manipulated via the deceptive endpoints. More particularly, the parameter library 108 comprises methods, described as source code, implementing specific behaviors, and where client and server code are built to complement one another.

A server methods generator 110 then implements server endpoints based on definitions of the deceptive endpoints 104, the elements defined in the configuration to determine the behavior of the endpoint, and the relevant code from the parameter library for actual implementation.

A client methods generator 112 implements client code that can talk to the endpoints described in the deceptive endpoints 104. The client behavior is taken from the configuration 106 and implemented thanks to relevant methods from the parameter library 108, as specified in the configuration 106.

Code weaver 114 then weaves the generated server code from the server methods generator 110 with the application's server code 116, to generate final server code 118. Code weaver 120 then weaves the generated client code from the client methods generator 112 with the application's client code 122, to generate final client code 122.

The deceptive endpoints 104 may be generated either manually or automatically. As a specific example of generating deceptive endpoints, consider an application with an endpoint having a method of "POST" and a path of "v2/store/order" for placing an order. The "v2" appears to indicate that this endpoint is version 2. An attacker might try to access the "v1" version if it is still active, which could have some unpatched, old vulnerabilities. Similarly, "v3" might provide access to an endpoint that is not yet fully developed and may have vulnerabilities. Deceptive endpoints can be created having a method of "POST" and a path of "v1/store/order" and "v3/store/order." These endpoints would not be accessed during genuine application use, so access indicates malicious action. Similarly, another deceptive endpoint can be created by changing, for example, the method from POST to DELETE, which if not prevented could allow an attacker to delete orders without authorization.

Deceptive endpoint candidates can be generated automatically for an application by modifying various aspects of valid endpoints for the application. To increase the likelihood that the deceptive endpoint candidates appear believable to an attacker, the modifications can be compared to a group of valid endpoints for other applications. The deceptive endpoint candidates that appear closest to real endpoints for other applications can be used as deceptive endpoints for the application.

A genuine endpoint may be automatically modified to create a deceptive endpoint for the application. The deceptive endpoint is not a valid endpoint for the application, so a requesting computing device accessing the deceptive endpoint indicates a malicious action. The endpoint can be modified by identifying a portion of the endpoint to modify (e.g., method, path, or parameter), creating one or more candidate deceptive endpoints in which the selected portion is modified (e.g., substituting a different method, altering the path, or creating or substituting a new parameter), and selecting at least one of the candidate deceptive endpoints as the deceptive endpoint.

The deceptive endpoint can be selected based on a scoring approach. The candidate deceptive endpoints may be compared to a group of valid API endpoints from other applications. The valid API endpoints from other applications can be collected from documentation files for the other applications, for example. The comparison increases the chance that the candidate will be believable to an attacker and something likely that the attacker would try (because the comparison is to valid endpoints). In an example embodiment, the candidate deceptive endpoints are scored based on similarity to the endpoints in the group (e.g., on a scale from 0 to 1.0, 1-10, 1-100, etc.). This scoring can be, for example, a distance calculation such as a Pearson correlation distance, which considers two objects to be similar if their features are highly correlated. Other distance calculation approaches can also be used.

In some examples, the endpoint is "flattened" before modification to create endpoint entries for different combinations of components of the endpoint. For example, if an endpoint has a method, path, and three parameters, three endpoint entries can be created, one for each combination of method, path, and parameter. Each of the endpoint entries can then be modified to create deceptive endpoint candidates. The endpoint can be flattened into, for example, a comma-separated value (CSV) format file.

Figure 2:
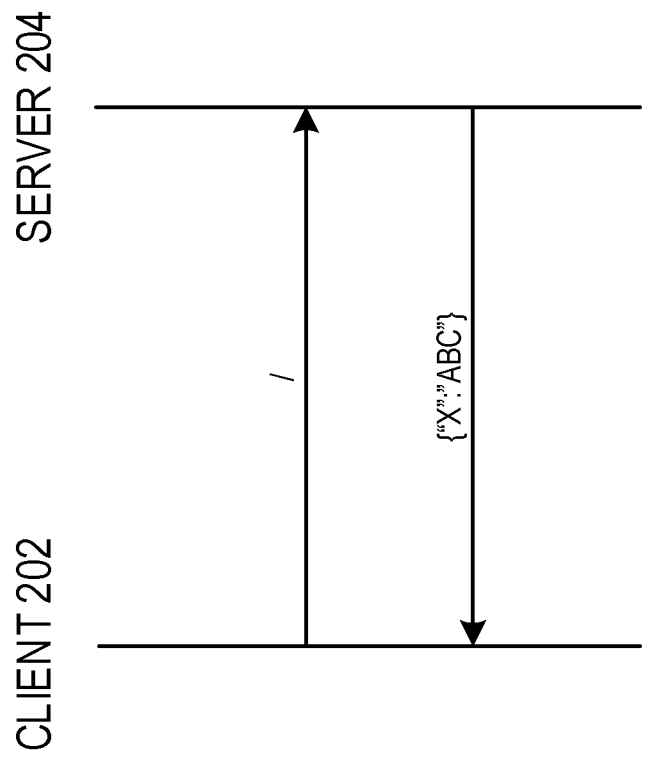
FIG. 2 is a ladder diagram illustrating a static response, in accordance with an example embodiment.

FIG. 2 is a ladder diagram illustrating a static response 200, in accordance with an example embodiment. This static response 200 is one example of a method in a parameter library. Here, client 202 invokes an endpoint and server 204 replies with a predefined static value (here, value of "X" is equal to "abc"). This can be used for sending deceptive information to the attacker. The corresponding server and client code could be as follows, for a server operating Java and a client operating React:
Client code: (none)
Server code:

```
File: StaticResponse.java
private static String staticResponse( ) {
    return "abc";
}
```

Notably, in the above there is no client code for this method, because the method does not require any automatic action by the client. The action performed by the client is the invoking of the endpoint, which is performed manually by the attacker. Alternatively it can be invoked by application logic, which may be desirable in cases where an attacker might listen passively to the exchanged traffic, so that the attacker will see the value and think it a valuable piece of information when in fact it is a honeytoken.

Figure 3:
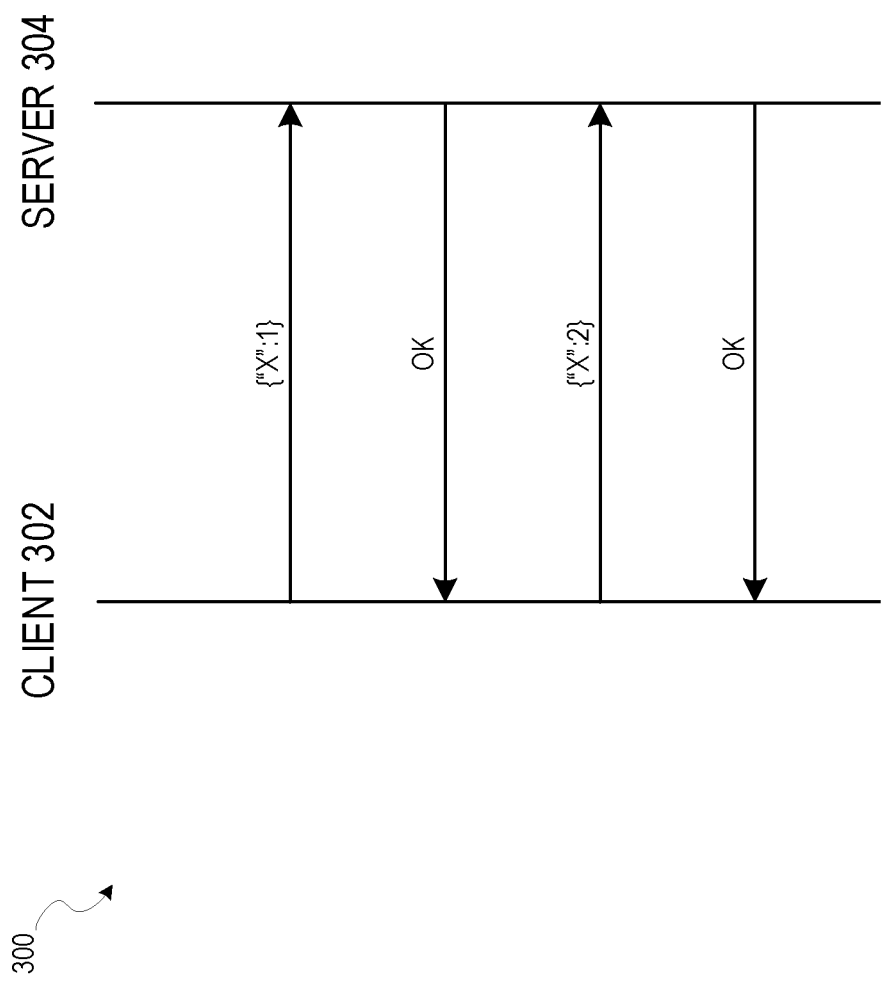
FIG. 3 is a ladder diagram illustrating an increment, in accordance with an example embodiment.

FIG. 3 is a ladder diagram illustrating an increment 300, in accordance with an example embodiment. The increment 300 is another example of a method in a parameter library. Here, client 302 sends information based on a certain logic, and the server 304 verifies that the logic is respected. A simple example would be a number that is incremented by 1, but another example would be if the client 302 and the server 304 share a seed value, so that an external observer could think that the values sent are arbitrary, whereas the server 304 could still verify the logic, such as with a one-time token generator. The corresponding server and client code could be as follows, for a server operating Java and a client operating React:
Client Code:

```
File: Increment.js
function increment( ) = {
    return X++;
}
```

Server Code:

```
File: Increment.java
private static int X;
private static void increment(int newX) {
    X++;
    If(X != newX) {
        System.err.println("Parameter tampering detected!");
    }
}
```

Figure 4:
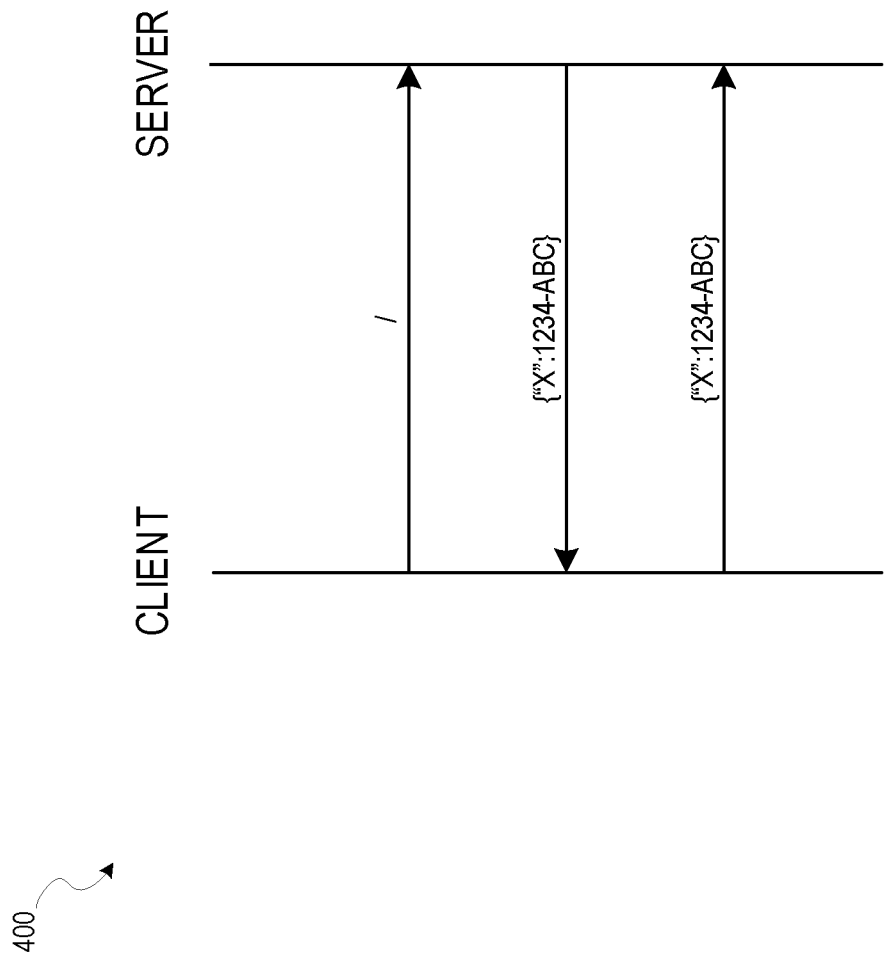
FIG. 4 is a ladder diagram illustrating a token reuse, in accordance with an example embodiment.

FIG. 4 is a ladder diagram illustrating a token reuse 400, in accordance with an example embodiment. The token reuse 400 is another example of a method in a parameter library. Here, client 402 issues a call to server 404, which then responds with a token. The server 404 then expects that the client 402 will return the token in a subsequent call. Here. an example of an exact replay is provided. In other words, the tokens are the same. In other embodiments, however, the server 404 expects that the client 402 will perform a transformation on the token prior to returning it, such as by incrementing it or encoding it in base64. Nevertheless, the server 404 knows what to expect because the client and server code are part of the same library and complement one another from the start. The corresponding server and client code could be as follows, for a server operating Java and a client operating React:
Client Code:

```
File: Mirror.js
function mirror(X) = {
    return X;
}
```

Server Code:

```
File: Mirror.java
private static String X;
private static String setValue( ) {
    X = "1234-abc";
    return X;
}
private static void checkValue(String newX) {
    If(X != newX) {
        System.err.println("Parameter tampering detected!");
    }
}
```

The client and server code can be made as complex or simple as desired. The server code validates what comes from the client and/or vice-versa, for detecting unwanted interaction. For example, code could be introduced that makes traffic look like server-to-server communication from an observer's perspective, enticing the latter into thinking that a server-side request forgery (SSRF) attack is possible.

The parameter library is a set of client and server methods, paired with respect to a certain parameter, aimed at detecting parameter probing and inconsistencies. These code snippets are embedded into an application and blended with both actual and deceptive endpoints. The configuration aims at enabling this binding. Below is an example configuration:

```
constants:
    seed1: integer: 23588283
    pub_key_1: ./rsa.pub
endpoints:
    GET /api/status
        client:
            timer: 60
        server:
            code: StaticResponse.java
            methods:
                staticResponse:statusCode
    GET /api/voucher
        client:
            after: GET /v2/store/order/{orderId}
        server:
            code: StaticResponse2.java
            methods:
                staticResponse:voucherCheck
    PUT /v2/store/orderDetails/{orderId}
        client:
            before: POST /v2/store/pay/{orderId}/payWithVoucher
            code: Mirror.js
            methods:
                mirror:confirmDetails
        server:
            code: Mirror.java
            methods:
                setValue:init
                checkValue:processDetails
            variables:
                X:orderConfirmNumber
honeytokens:
    voucher1: string: "AB423-F"
```

The "constants" part describes values which shall be made known to both the client and server. Here, a seed value is used to calibrate a one-time-token or a cryptographic function, as well as references to files which should be made available to client and server, for example here a public key. These values will translate into variables instantiated into the respective client and server code.

The "endpoints" describe how the client and server implementations should behave for each of the deceptive endpoints of the 'deceptive endpoints' description. The sample configuration says the following:

The client should invoke the GET/api/status endpoint every 60 seconds—meaning as well that the server should check whether it rightly receives such a call every 60 seconds approximately and send an alert when it is not the case.

The server, when receiving a GET/api/status request, should execute the methods as described in the file StaticResponse.java, and the method staticResponse should be renamed as statusCode in the final server code. Renaming server methods is not critical, however renaming client methods will have a big impact in keeping the deception hard to notice. The output of the statusCode method will be sent back according to the OpenAPI specification of the endpoint available in the deceptive endpoints storage.

The next entry in the configuration says the following:

The client code should be modified so that after each call to GET/v2/store/order/{orderId}, it makes a call to GET/api/voucher. The server shall also check, when it receives a call to GET/v2/store/order/{orderId}, that it receives subsequently a call to GET/api/voucher. If that's not the case, it should alert.

The server, when receiving a call to GET/api/voucher, should execute the method staticResponse (renamed as voucherCheck) of the file StaticResponse2.java. This method could return for example the value of 'voucher1', defined at the end of the configuration file. The java file could of course also implement a dynamic array generating and delivering voucher values on-demand instead of relying on this static value.

The third endpoint entry may be interpreted as follows:

The client code should be modified so that before each call to POST/v2/store/pay/{orderId}/payWithVoucher, a call is made to PUT/v2/store/orderDetails/{orderId}. The server should then check if a call to PUT/v2/store/orderDetails/{orderId} is indeed followed by the respective POST, and upon receiving the POST, that the PUT deceptive endpoint was indeed called. If that is not the case, it should alert an administrator. This detection can be performed by comparing log timestamps (with an error margin to cope with network issues), by exchanging a nonce-like value between the two requests, or by letting a deceptive endpoint mirror certain parameter of the real request.

Further, since the PUT and the POST share the same variable name {orderId}, it means that the PUT request of the client will send the same value as the one sent during the POST. The server shall then further check that these two received values are indeed the same, and if not, raise an alert.

The client, when performing the PUT request, will execute the method mirror from the file Mirror.js, renamed as confirmDetails. The variable X of the method mirror will be renamed orderConfirmNumber as described in the 'variables' part of the configuration. The server mapping will be done in a similar way, meaning that upon performing a PUT request, the {orderId} will be matching with the POST {orderId}, and that the payload of the PUT will be a json mirroring the value received from the server when it executed the setValue method: {"orderConfirmNumber": "1234-abc"}

The last part of the configuration lists honeytokens. They are similar in nature to the constants part in that they are constant values, they are instantiated based on variable names in the deceptive code methods. They will further be checked by the server, in that if any non-deceptive endpoint passes one of the defined values as a parameter, this will trigger an alert.

Turning now to code weaving, this part takes the code generated by instantiating the deceptive endpoints according to the configuration and using the code of the parameter library, and mixes it with the original source code.

Here, the code weaver acts to make sure that the 'before' and 'after' keywords are properly implemented, e.g. change the call to the real endpoint to invoke the deceptive endpoint just before or just after. In an example embodiment, the code weaver may be implemented using Aspect Oriented Programming (AOP) in the code files of the parameter library and by using an actual AOP code weaver.

Other techniques could be envisioned to make the library code blend better with the client code, for example using the concept of code mutation.

Figure 5:
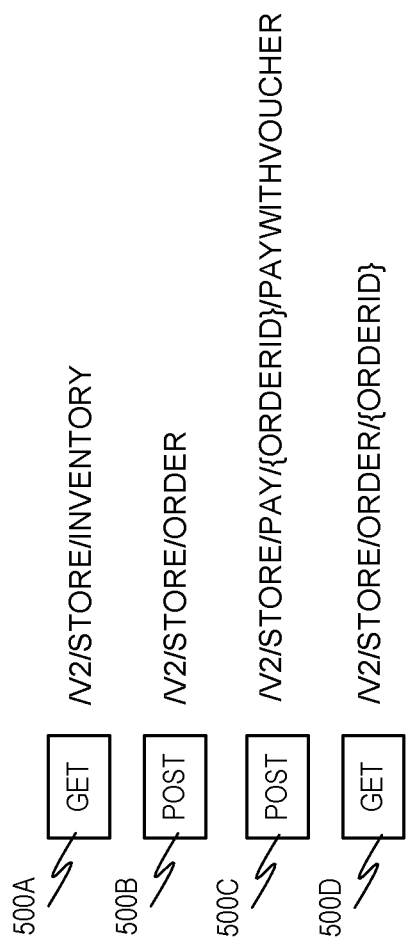
FIG. 5 is a diagram illustrating four endpoints exposed by a server application, in an example embodiment.

A use case is now presented. Here, the application is implemented as a REST service which follows the OpenAPI format, and a client consuming this REST service may be a mobile application. A server application for this application may expose four endpoints. FIG. 5 is a diagram illustrating four endpoints 500A, 500B, 500C, 500D exposed by a server application, in an example embodiment.

A mobile application may rely on these APIs, for example, to place an order, pay for an order, or view an order.

Typical attacks might include

Passively Listen to Traffic while Working with the Application

An adversary, either having a valid user account or in position to perform a man-in-the-middle attack, will capture the exchanged data between the mobile app and the server. This will provide information which can be used to attack, such as:

The names of the server endpoints
The order in which requests are processed
The format of exchanged parameters and example parameter values Probe Endpoint Names If the server API is not public (which is often the case), after observing the traffic the adversary can identify which endpoint is called and then try to call the endpoints directly. She will then both try to probe the endpoints revealed by the application, as well as try to find other endpoints.

Probe Request Order

The adversary will try to see what happens if a certain request is skipped or if the order is changed. For example, is it possible to resolve an order without paying it by simply not invoking the/pay/endpoint? Or is it possible to pay by reusing an old voucher number?

Play with Parameters' Format

The adversary will try to decode base64-encoded content to potentially find interesting information and as a means to inject content. She will also try to replay parameter values or add/subtract 1 to parameters which seem to be predicable. For example, add 1 to a documentId hoping to see the next document.

In order to thwart the aforementioned attacks, in an example embodiment deceptive traffic is mixed with genuine traffic. More particularly:

By adding client/server communication, passive listening will discover deceptive endpoints which, when interacted with directly, will detect an attack By adding timing constraints to some of the communication, we can detect out-of-sync requests By adding client-server logic to how parameters are sent, we can detect modification of parameters By adding constraints such as calling a deceptive endpoint systematically after a genuine call, we can detect some probing with the request order By making some of the parameters predictable, such as numbers increasing in sequence or bound to the current date, we can detect parameter probing.

By encoding information, we can embed deceptive information such as a username and further detect if the information is reused somewhere.

Figure 6:
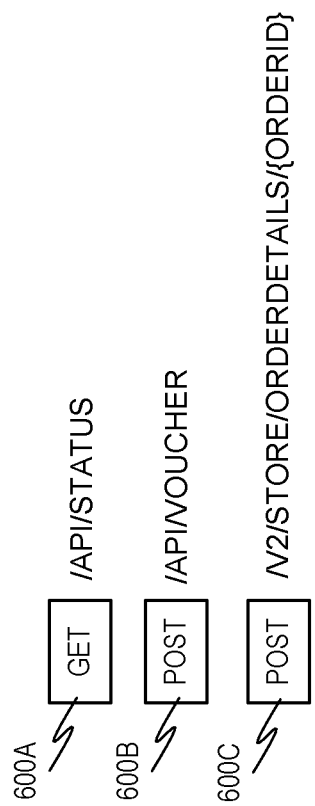
FIG. 6 is a diagram illustrating three deceptive endpoints exposed by a server application, in an example embodiment.

In order to accomplish this, three deceptive endpoints may be introduced. FIG. 6 is a diagram illustrating three deceptive endpoints /api/status 600A,/api/voucher 600B, /v2/store/orderdetails/{orderId} 600C exposed by a server application, in an example embodiment. The endpoint /api/status 600A shall be called every minute by the application. The server shall reply with information such as an ID number or a hash value. If the server detects network traffic while the call to /api/status does not come, it concludes that the application is being manipulated (typically via an interception proxy). The return values from the server can also be used as honeytokens: if the application detects the presence of one of them anywhere in a user input, this means that the user tried to reuse a parameter token—this is also detected as an attack. As another example, the return value can decode into a deceptive endpoint which is not used actively by the application.

The endpoint /api/voucher 600B is called by the client application each time the GET/v2/store/order/{orderId} endpoint is invoked. Again, if the server sees a call to this endpoint but not to the other endpoint or vice-versa, it can be concluded that the application is being probed and thus under attack. The server sends back a list of fake voucher IDs, if the user tries to use these IDs as valid vouchers, we again learn that the application is under attack.

The endpoint /v2/store/orderDetails/{orderId} 600C is called by the client application each time the POST/v2/store/pay/{orderId}/payWithVoucher endpoint is called. As before, if the server notices a change in the order of the received requests, or one request without the other, or an inconsistency between the orderId of this request and the one of the other request, we can conclude that the application is under attack. Upon performing the PUT, the client will send in the body a predictable parameter, such as <orderId>-<sequence number>. Any manipulation of this number will also be noticed as an application probe.

By combining these protections, the attacks introduced earlier can be prevented.

Figure 7:
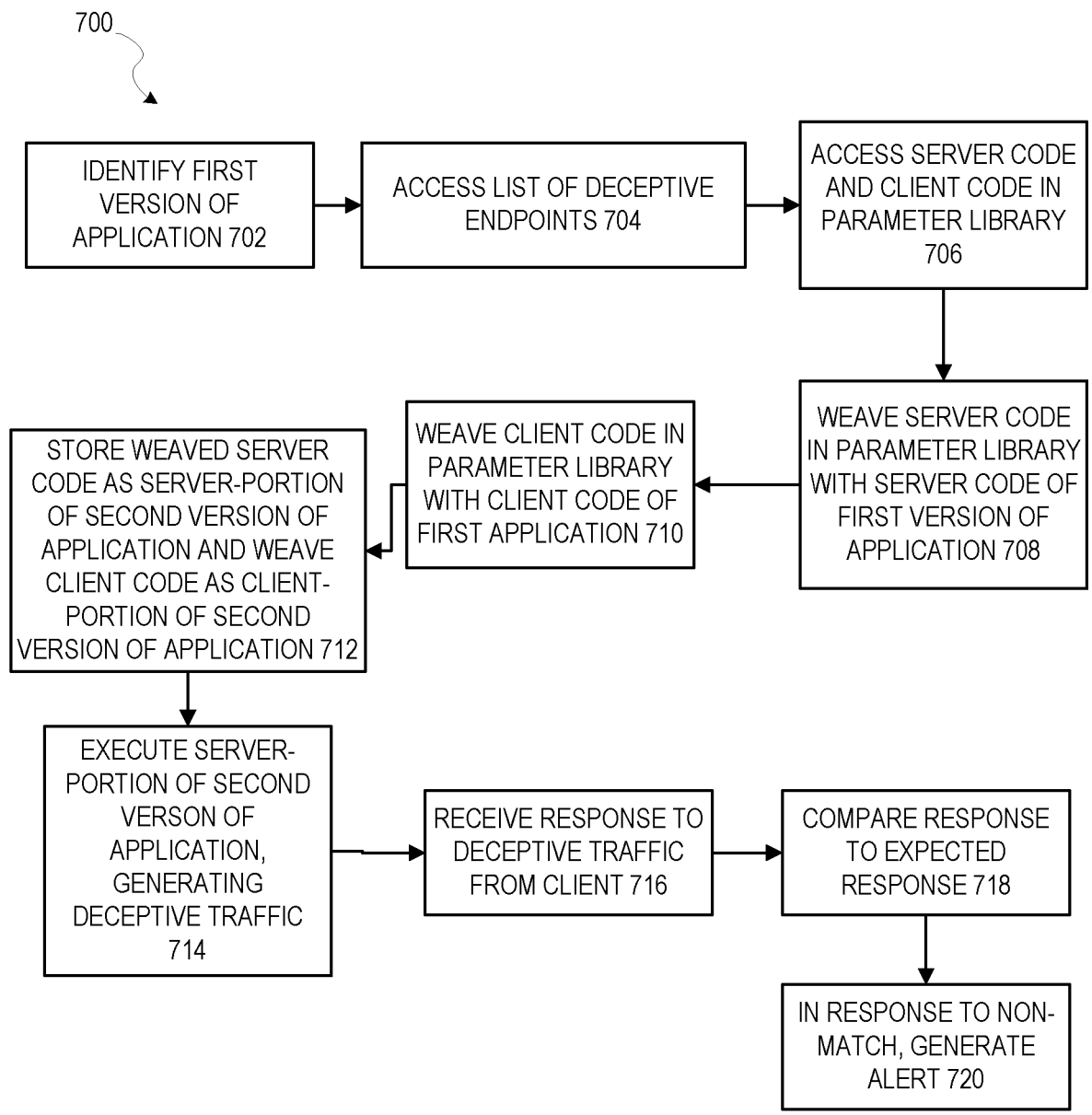
FIG. 7 is a flow diagram illustrating a method for generating deceptive traffic, in accordance with an example embodiment.

FIG. 7 is a flow diagram illustrating a method 700 for generating deceptive traffic, in accordance with an example embodiment. At operation 702, a first version of an application having a plurality of predefined endpoints is identified. Each predefined endpoint is a portion of the application that receives communications over a network via an interface. An example of such a predefined endpoint is an API.

At operation 704, a list of deceptive endpoints stored in a database is accessed. Each deceptive endpoint is an endpoint not contained in the plurality of predefined endpoints. In other words, a deceptive endpoint may be any endpoint that is not defined by the first version of the application. At operation 706, server code and client code stored in a parameter library in the database are accessed. The server code and client code stored in the parameter library define functions not needed to run the first version of the application. A function is not needed to run the first version of the application if there are no executions of the first version of the application that would execute the function.

At operation 708, the server code stored in the parameter library is weaved with server code of the first version of the application, using a configuration file stored in the database. The configuration file links parameters defined in the list of deceptive endpoints with the server code stored in the parameter library. At operation 710, the client code stored in the parameter library is weaved with client code of the first version of the application, using the configuration file. At operation 712, the weaved server code is stored as a server-portion of a second version of the application and the weaved client code is stored as a client-portion of the second version of the application.

At operation 714, the server-portion of the second version of the application is executed, causing deceptive traffic to be sent from a server to a client accessing a deceptive endpoint in the plurality of deceptive endpoints.

At operation 716, a response to the deceptive traffic is received from the client. At operation 718, the response is compared to an expected response based on the server code stored in the parameter library. At operation 720, in response to a determination that the response does not match the expected response, an alert is generated indicating that an attack is in progress.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
identifying a first version of an application having a plurality of predefined endpoints, a predefined endpoint being a portion of the application that receives communications over a network via an interface;
accessing a list of deceptive endpoints stored in a database, a deceptive endpoint being an endpoint not contained in the plurality of predefined endpoints;
accessing server code and client code stored in a parameter library in the database, the server code and client code stored in the parameter library defining functions not needed to run the first version of the application;
weaving the server code stored in the parameter library with server code of the first version of the application, using a configuration file stored in the database, the configuration file linking parameters defined in the list of deceptive endpoints with the server code stored in the parameter library;
weaving the client code stored in the parameter library with client code of the first version of the application, using the configuration file;
storing the weaved server code as a server-portion of a second version of the application and the weaved client code as a client-portion of the second version of the application; and
executing the server-portion of the second version of the application, causing deceptive traffic to be sent from a server to a client accessing a deceptive endpoint in the plurality of deceptive endpoints.

Example 2. The system of Example 1, wherein the operations further comprise:
receiving a response to the deceptive traffic from the client;
comparing the response to an expected response based on the server code stored in the parameter library;
in response to a determination that the response does not match the expected response, generating an alert indicating that an attack is in progress.

Example 3. The system of Examples 1 or 2, wherein the plurality of predefined endpoints and the deceptive endpoints are application program interfaces (APIs).

Example 4. The system of any of Examples 1-3, wherein the server code stored in the parameter library, when executed, causes a modification to a value of a parameter defined in the list of deceptive endpoints.

Example 5. The system of any of Examples 1-4, wherein the weaving the client code includes inserting a call to a deceptive endpoint just before or just after a call to a predefined endpoint, as indicated in the configuration file.

Example 6. The system of any of Examples 1-5, wherein the configuration file incudes a constants portion, the constants portion indicating values that will be made known to both the client and the server.

Example 7. The system of any of Examples 1-6, wherein the configuration file incudes an endpoints portion, the endpoints portion indicating how the server and the client should act for at least one of the deceptive endpoints.

Example 8. A method comprising:
identifying a first version of an application having a plurality of predefined endpoints, a predefined endpoint being a portion of the application that receives communications over a network via an interface;
accessing a list of deceptive endpoints stored in a database, a deceptive endpoint being an endpoint not contained in the plurality of predefined endpoints;
accessing server code and client code stored in a parameter library in the database, the server code and client code stored in the parameter library defining functions not needed to run the first version of the application;
weaving the server code stored in the parameter library with server code of the first version of the application, using a configuration file stored in the database, the configuration file linking parameters defined in the list of deceptive endpoints with the server code stored in the parameter library;
weaving the client code stored in the parameter library with client code of the first version of the application, using the configuration file;
storing the weaved server code as a server-portion of a second version of the application and the weaved client code as a client-portion of the second version of the application; and
executing the server-portion of the second version of the application, causing deceptive traffic to be sent from a server to a client accessing a deceptive endpoint in the plurality of deceptive endpoints.

Example 9. The method of Example 8, further comprising:
receiving a response to the deceptive traffic from the client;
comparing the response to an expected response based on the server code stored in the parameter library;

in response to a determination that the response does not match the expected response, generating an alert indicating that an attack is in progress.

Example 10. The method of Examples 8-9, wherein the plurality of predefined endpoints and the deceptive endpoints are application program interfaces (APIs).

Example 11. The method of any of Examples 8-10, wherein the server code stored in the parameter library, when executed, causes a modification to a value of a parameter defined in the list of deceptive endpoints.

Example 12. The method of any of Examples 8-11, wherein the weaving the client code includes inserting a call to a deceptive endpoint just before or just after a call to a predefined endpoint, as indicated in the configuration file.

Example 13. The method of any of Examples 8-12, wherein the configuration file incudes a constants portion, the constants portion indicating values that will be made known to both the client and the server.

Example 14. The method of any of Examples 8-13, wherein the configuration file incudes an endpoints portion, the endpoints portion indicating how the server and the client should act for at least one the deceptive endpoints.

Example 15. A non-transitory machine-readable medium storing instructions which, when executed by one or more processors, cause the one or more processors to perform operations comprising:
  identifying a first version of an application having a plurality of predefined endpoints, a predefined endpoint being a portion of the application that receives communications over a network via an interface;
  accessing a list of deceptive endpoints stored in a database, a deceptive endpoint being an endpoint not contained in the plurality of predefined endpoints;
  accessing server code and client code stored in a parameter library in the database, the server code and client code stored in the parameter library defining functions not needed to run the first version of the application;
  weaving the server code stored in the parameter library with server code of the first version of the application, using a configuration file stored in the database, the configuration file linking parameters defined in the list of deceptive endpoints with the server code stored in the parameter library;
  weaving the client code stored in the parameter library with client code of the first version of the application, using the configuration file;
  storing the weaved server code as a server-portion of a second version of the application and the weaved client code as a client-portion of the second version of the application; and
  executing the server-portion of the second version of the application, causing deceptive traffic to be sent from a server to a client accessing a deceptive endpoint in the plurality of deceptive endpoints.

Example 16. The non-transitory machine-readable medium of Example 15, wherein the operations further comprise:
  receiving a response to the deceptive traffic from the client;
  comparing the response to an expected response based on the server code stored in the parameter library;
  in response to a determination that the response does not match the expected response, generating an alert indicating that an attack is in progress.

Example 17. The non-transitory machine-readable medium of Examples 15 or 16, wherein the plurality of predefined endpoints and the deceptive endpoints are application program interfaces (APIs).

Example 18. The non-transitory machine-readable medium of any of Examples 15-17, wherein the server code stored in the parameter library, when executed, causes a modification to a value of a parameter defined in the list of deceptive endpoints.

Example 19. The non-transitory machine-readable medium of any of Examples 15-18, wherein the weaving the client code includes inserting a call to a deceptive endpoint just before or just after a call to a predefined endpoint, as indicated in the configuration file.

Example 20. The non-transitory machine-readable medium of any of Examples 15-19, wherein the configuration file incudes a constants portion, the constants portion indicating values that will be made known to both the client and the server.

Figure 8:
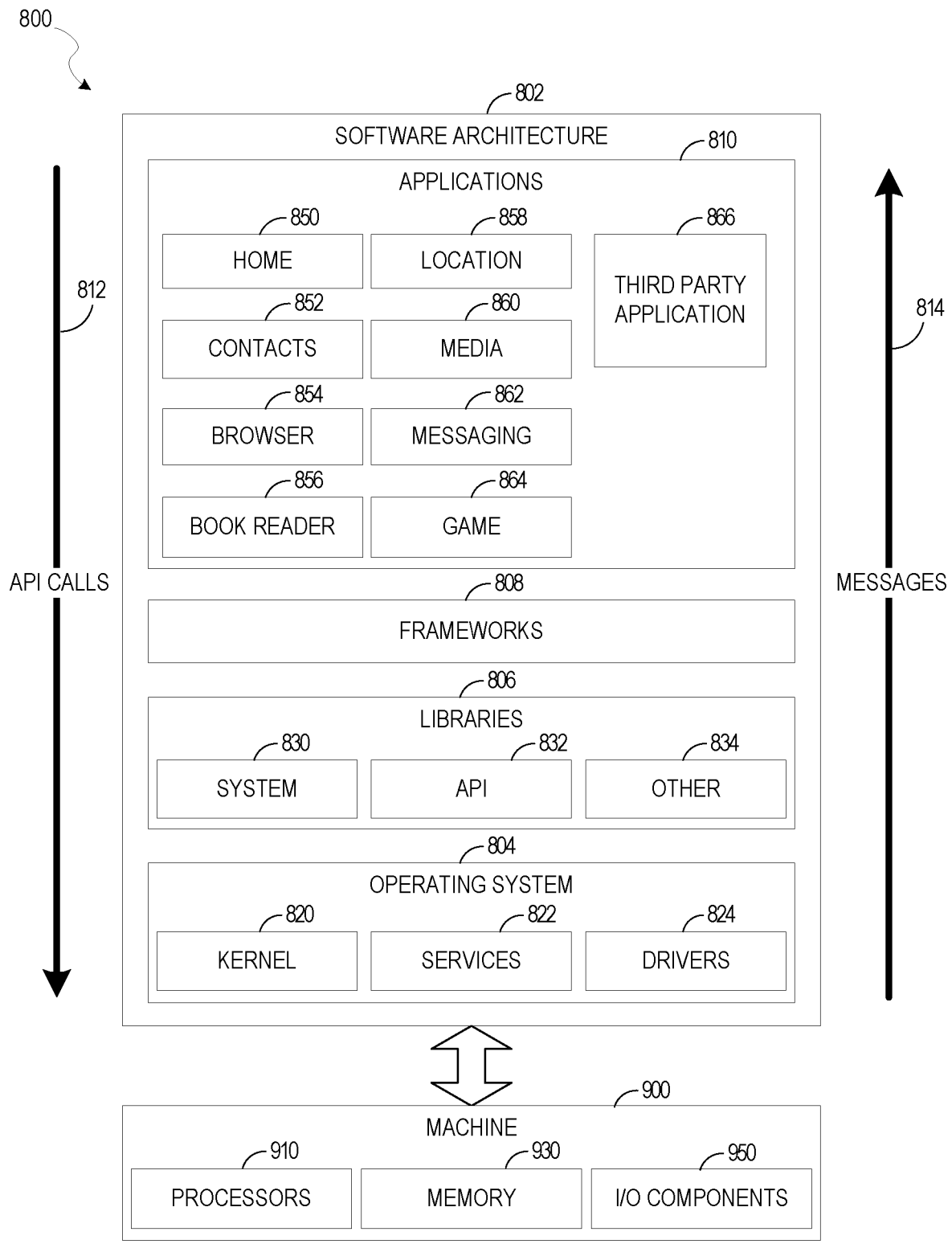
FIG. 8 is a block diagram illustrating an example architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke Application Program Interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 can are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
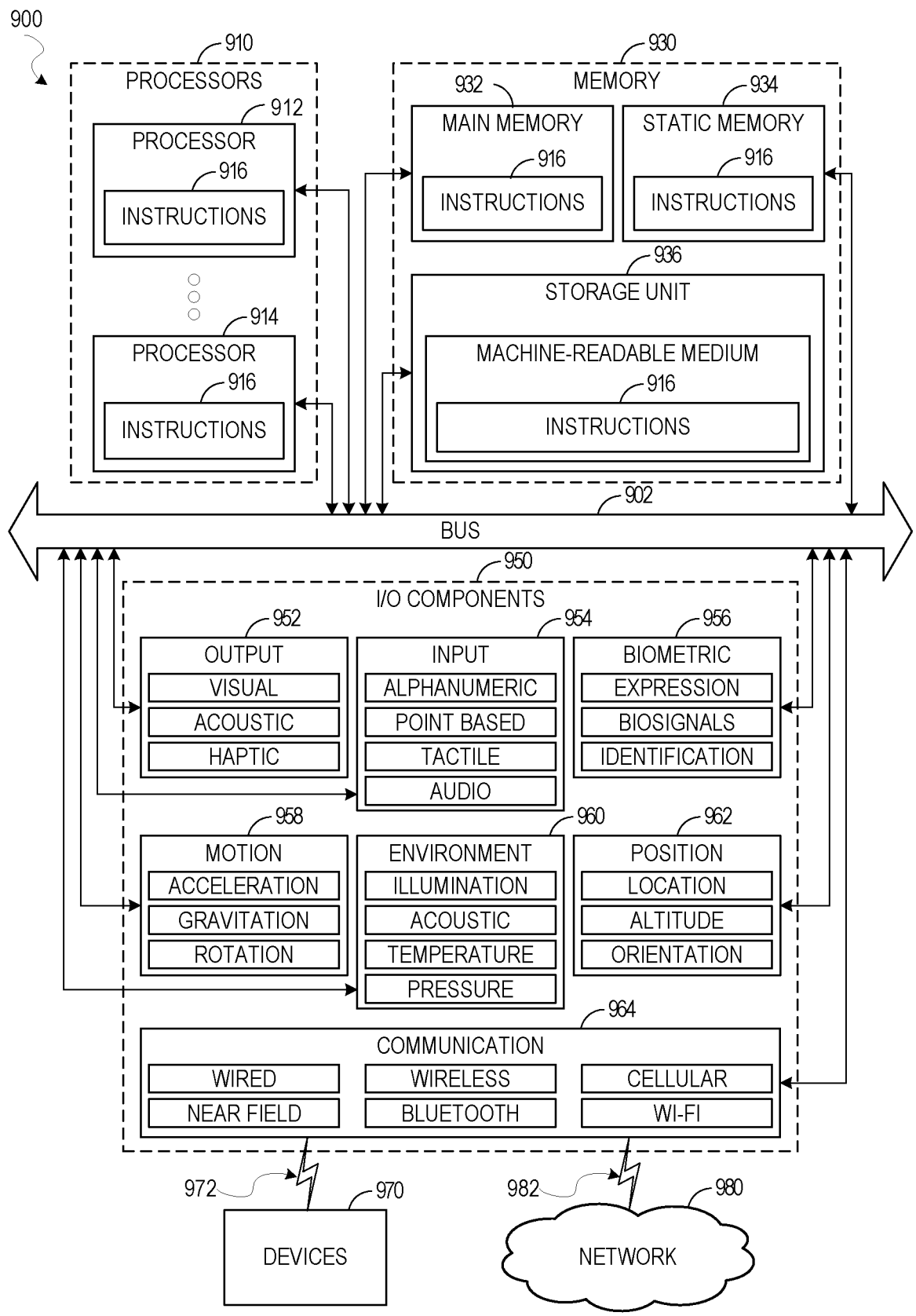
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIGS. 5 and 6. Additionally, or alternatively, the instructions 916 may implement FIGS. 1-6 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with one another such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   identifying a first version of an application having a plurality of predefined endpoints, a predefined endpoint being a portion of the application that receives communications over a network via an interface;
   accessing a list of deceptive endpoints stored in a database, a deceptive endpoint being an endpoint not contained in the plurality of predefined endpoints;
   accessing server code and client code stored in a parameter library in the database, the server code and client code stored in the parameter library defining functions not needed to run the first version of the application;
   weaving the server code stored in the parameter library with server code of the first version of the application, using a configuration file stored in the database, the configuration file linking parameters defined in the list of deceptive endpoints with the server code stored in the parameter library, the weaving the server code including inserting parameters in the list of the deceptive endpoints that are linked to the server code;
   weaving the client code stored in the parameter library with client code of the first version of the application, using the configuration file;
   storing the weaved server code as a server-portion of a second version of the application and the weaved client code as a client-portion of the second version of the application;
   loading the server-portion of the second version of the application into memory for execution; and
   executing the server-portion of the second version of the application, causing deceptive traffic to be sent from a server to a client accessing a deceptive endpoint in the plurality of deceptive endpoints.

2. The system of claim 1, wherein the operations further comprise:
   receiving a response to the deceptive traffic from the client;
   comparing the response to an expected response based on the server code stored in the parameter library;
   in response to a determination that the response does not match the expected response, generating an alert indicating that an attack is in progress.

3. The system of claim 1, wherein the plurality of predefined endpoints and the deceptive endpoints are application program interfaces (APIs).

4. The system of claim 1, wherein the server code stored in the parameter library, when executed, causes a modification to a value of a parameter defined in the list of deceptive endpoints.

5. The system of claim 1, wherein the weaving the client code includes inserting a call to a deceptive endpoint just before or just after a call to a predefined endpoint, as indicated in the configuration file.

6. The system of claim 1, wherein the configuration file incudes a constants portion, the constants portion indicating values that will be made known to both the client and the server.

7. The system of claim 1, wherein the configuration file incudes an endpoints portion, the endpoints portion indicating how the server and the client should act for one or more of the deceptive endpoints.

8. A method comprising:
   identifying a first version of an application having a plurality of predefined endpoints, a predefined endpoint being a portion of the application that receives communications over a network via an interface;
   accessing a list of deceptive endpoints stored in a database, a deceptive endpoint being an endpoint not contained in the plurality of predefined endpoints;
   accessing server code and client code stored in a parameter library in the database, the server code and client code stored in the parameter library defining functions not needed to run the first version of the application;
   weaving the server code stored in the parameter library with server code of the first version of the application, using a configuration file stored in the database, the configuration file linking parameters defined in the list of deceptive endpoints with the server code stored in the parameter library, the weaving the server code including inserting parameters in the list of the deceptive endpoints that are linked to the server code;
   weaving the client code stored in the parameter library with client code of the first version of the application, using the configuration file;
   storing the weaved server code as a server-portion of a second version of the application and the weaved client code as a client-portion of the second version of the application;
   loading the server-portion of the second version of the application into memory for execution; and
   executing the server-portion of the second version of the application, causing deceptive traffic to be sent from a server to a client accessing a deceptive endpoint in the plurality of deceptive endpoints.

9. The method of claim 8, further comprising:
receiving a response to the deceptive traffic from the client;
comparing the response to an expected response based on the server code stored in the parameter library;
in response to a determination that the response does not match the expected response, generating an alert indicating that an attack is in progress.

10. The method of claim 8, wherein the plurality of predefined endpoints and the deceptive endpoints are application program interfaces (APIs).

11. The method of claim 8, wherein the server code stored in the parameter library, when executed, causes a modification to a value of a parameter defined in the list of deceptive endpoints.

12. The method of claim 8, wherein the weaving the client code includes inserting a call to a deceptive endpoint just before or just after a call to a predefined endpoint, as indicated in the configuration file.

13. The method of claim 8, wherein the configuration file incudes a constants portion, the constants portion indicating values that will be made known to both the client and the server.

14. The method of claim 8, wherein the configuration file incudes an endpoints portion, the endpoints portion indicating how the server and the client should act for one or more of the deceptive endpoints.

15. A non-transitory machine-readable medium storing instructions which, when executed by one or more processors, cause the one or more processors to perform operations comprising:
identifying a first version of an application having a plurality of predefined endpoints, a predefined endpoint being a portion of the application that receives communications over a network via an interface;
accessing a list of deceptive endpoints stored in a database, a deceptive endpoint being an endpoint not contained in the plurality of predefined endpoints;
accessing server code and client code stored in a parameter library in the database, the server code and client code stored in the parameter library defining functions not needed to run the first version of the application;
weaving the server code stored in the parameter library with server code of the first version of the application, using a configuration file stored in the database, the configuration file linking parameters defined in the list of deceptive endpoints with the server code stored in the parameter library, the weaving the server code including inserting parameters in the list of the deceptive endpoints that are linked to the server code;
weaving the client code stored in the parameter library with client code of the first version of the application, using the configuration file;
storing the weaved server code as a server-portion of a second version of the application and the weaved client code as a client-portion of the second version of the application;
loading the server-portion of the second version of the application into memory for execution; and
executing the server-portion of the second version of the application, causing deceptive traffic to be sent from a server to a client accessing a deceptive endpoint in the plurality of deceptive endpoints.

16. The non-transitory machine-readable medium of claim 15, wherein the operations further comprise:
receiving a response to the deceptive traffic from the client;
comparing the response to an expected response based on the server code stored in the parameter library;
in response to a determination that the response does not match the expected response, generating an alert indicating that an attack is in progress.

17. The non-transitory machine-readable medium of claim 15, wherein the plurality of predefined endpoints and the deceptive endpoints are application program interfaces (APIs).

18. The non-transitory machine-readable medium of claim 15, wherein the server code stored in the parameter library, when executed, causes a modification to a value of a parameter defined in the list of deceptive endpoints.

19. The non-transitory machine-readable medium of claim 15, wherein the weaving the client code includes inserting a call to a deceptive endpoint just before or just after a call to a predefined endpoint, as indicated in the configuration file.

20. The non-transitory machine-readable medium of claim 15, wherein the configuration file incudes a constants portion, the constants portion indicating values that will be made known to both the client and the server.

* * * * *